April 11, 1967 TAKESHI KUSAKABE 3,313,581
AUTOMATIC CONVERTER FOR THE ACCURACY OF ROTATION
Filed July 15, 1964
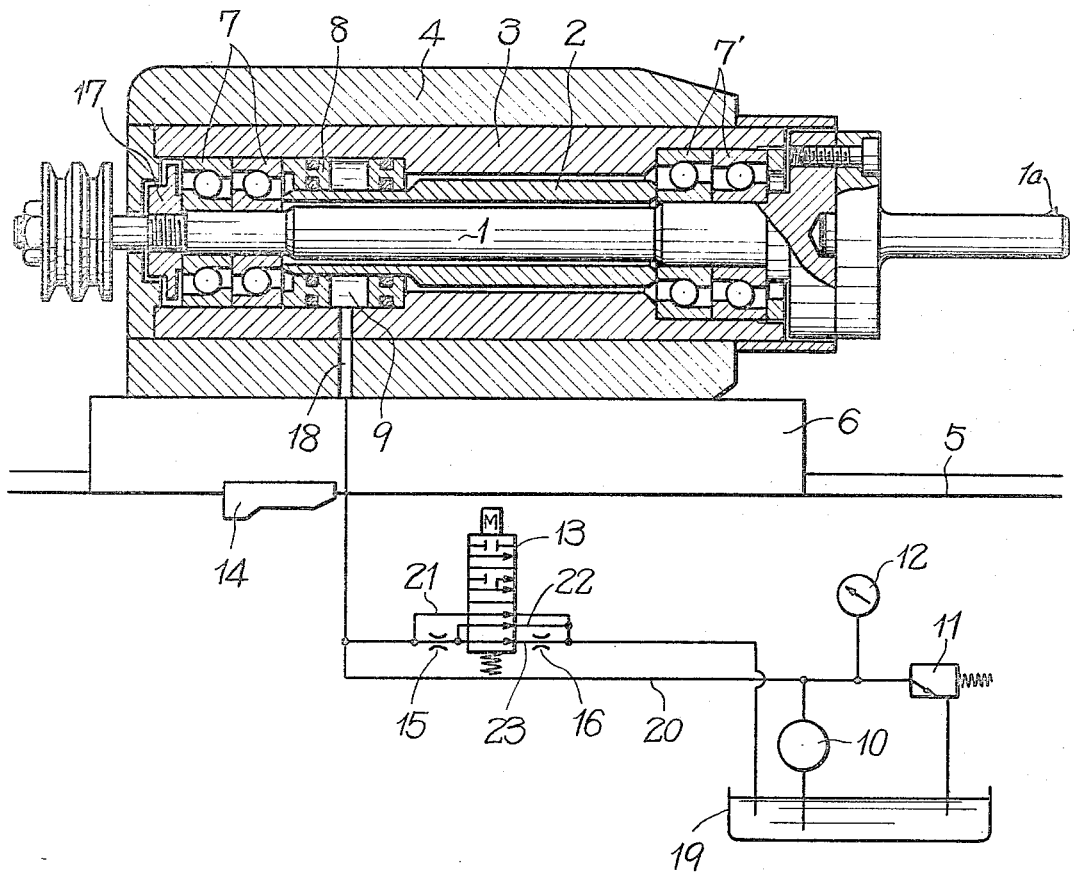
INVENTOR
TAKESHI KUSAKABE
By Linton and Linton
ATTORNEYS

3,313,581
AUTOMATIC CONVERTER FOR THE ACCURACY OF ROTATION
Takeshi Kusakabe, Kariya-shi, Japan, assignor to Toyota Koki Kabushiki Kaisha, Kariya-shi, Japan
Filed July 15, 1964, Ser. No. 382,871
Claims priority, application Japan, July 16, 1963, 38/38,620
1 Claim. (Cl. 308—189)

The present invention relates to a control device of preload applied to a bearing for rotating shaft of a machine, which comprises the means of controlling the preload applied by fluid pressure to a bearing for rotating shaft of a machine, so as to obtain the most favorable preload applied to the bearing for any required accuracy of the rotating shaft.

As is well known, in order to improve the accuracy of rotating shaft of machine-tool or the like, a certain preload is applied to the ball or roller bearing for said shaft, by means of some elastic material such as coil spring abutting against the inner or outer metal of said bearing so as to cause a necessary axial displacement of said bearing metal.

However, such means of applying preload has serious defects as mentioned hereunder:

In this case, a certain preload can be applied to the bearing by means of some predetermined elasticity, which, once settled, is unvariable, and its adjustment from outside during the working of the machine is impossible. Accordingly, in practice, a stronger preload than really required is applied to the bearing. As a result, a greater driving power is required and an earlier wear of said bearing is caused. In order to assure a predetermined accuracy of the rotating shaft, an early re-adjustment must be effected by dismounting said bearing. Moreover, owing to the thermal expansion of the working shaft, the once settled bearing by predetermined preload can not keep its initial accuracy.

With a view to eliminate such inconveniences as above-mentioned, the present invention aims to provide a control device of preload applied to a bearing for rotating shaft of a machine, in particular, a machine-tool or the like, wherein the preload applied by fluid pressure to said bearing is so controlled from outside during the working of the machine that the most favorable preload can be adjustably applied to said bearing for any required accuracy of said rotating shaft.

An exemplary embodiment of the present invention will now be described with reference to the accompanying drawing, which shows a longitudinal cross section view of a boring machine comprising the control device of preload by the invention.

Within a body 4 of the machine, there is provided a spindle 1 with a loose sleeve 2 housed in a shaft cover 3. The shaft cover 3 is fixed to the body 4, which is also fixed on a saddle 6 slidably supported on a bed 5 of the machine.

The spindle 1 carrying tool 1a is supported by two units of ball bearings 7 and 7' provided between said shaft cover 3 and each end of said spindle 1. Adjacent to the bearing unit 7, an annular push member 8 is provided within an annular chamber 9 arranged between the shaft cover 3 and the sleeve 2. Said annular chamber 9 is supplied by fluid pressure through a channel 18 by a pump 10. The push member 8 is slidably fitted on the sleeve 2 and adapted to be pushed against the outer race of the bearing 7 by fluid pressure supplied within said annular chamber 9. By this pushing action of the push member 8, the outer race of the bearing 7 is forced to be slightly displaced axially, whereby an appropriate preload can be applied to the bearing. This pushing action is also transmitted by intermediary of lock nut 17 and spindle 1 to another bearing unit 7'.

The oil under pressure is supplied by means of a pump 10 from a reservoir 19 through a supply pipe 20 into the annular actuating chamber 9. The overall oil pressure to be supplied is adjusted previously to any desirable value by an adjustable valve 11 and is read on a manometer 12. In order to control the oil pressure supplied to the annular chamber 9 so that any desirable pressure is selected for applying appropriate preload to the bearing 7 and 7', there is provided a regulator valve 13 which may be regulated by a dog 14 provided on the saddle 6 or electromagnetically or manually. The supply pipe 20 can be connected, on its way to the chamber 9, to the reservoir 19 by first return pipe 21 or second return pipe 22 or third return pipe 23, according to the requirements by control of the valve 13. The first return pipe 21 permits the pressure oil delivered by the pump 10 to return directly to the reservoir 19 before enteing into the actuating chamber 9. The second return pipe 22 comprises a throttle 15 and the third return pipe 23 comprises two throttles 15 and 16.

The device operates as follows:

When no preload is required to be applied on the bearing 7 and 7', the regulator valve 13 is regulated so as to connect the supply pipe 20 to the reservoir 19 by the first return pipe 21. By this regulation, no susceptible pressure appears within the actuating chamber 9, and accordingly no preload is applied to the bearing 7 and 7'.

When the rough machining is required to be effected, the regulator valve 13 is regulated so as to connect the supply pipe 20 to the reservoir 19 by the second return pipe 22. By this regulation, the first stage of high pressure appears within the actuating chamber 9 because of throttling action in the return pipe 22 for oil returning to the reservoir 19, and accordingly a desirable preload is applied to the bearings 7 and 7' by this high pressure.

When the finish machining is required to be effected, the regulator valve 13 is regulated so as to connect the supply pipe 20 to the reservoir 19 by the third return pipe 23. By this regulation, the second stage of high pressure (higher than that of the first stage) appears within the actuating chamber 9 because of double throttling actions in the return pipe 23 for oil returning to the reservoir 19, and accordingly a stronger preload is applied to the bearings 7 and 7' by this higher pressure, which prevents any vibrations of the rotating shaft 1 and assures an accurate finish machining.

As is clear from the above-mentioned, according to the present invention, the most favorable and efficient preload can be adjustably applied by means of fluid pressure to the bearings for any required accuracy of the rotating shaft of the machine, during the working of the machine, by outside control of the regulator valve, and accordingly, a stable machining is maintained with constant preload required.

It should be understood that various modifications may be made in the illustrative embodiment of the invention shown and described without exceeding the scope of the invention.

What is claimed is:

Means for automatically changing a preload applied to bearings comprising a slideable saddle, roller bearings mounted on said saddle, a tool carrying spindle rotatably supported by said bearings, means providing a chamber adjacent at least one of said bearings, a pushing element slideably positioned in said chamber and capable of pushing against the outer race of said adjacent roller bearing, a fluid circuit connected to said chamber, means for supplying fluid under pressure to said fluid circuit and thus pushing said pushing element against the adjacent bearing outer race to place preloads thereon as required depending upon whether the spindle is to be rotated without a load, stopped or loaded for working the tool thereon, a valve provided in said circuit for contolling the fluid moving therein, and means carried by said saddle for controlling said valve depending on the positions of said spindle.

References Cited by the Examiner

UNITED STATES PATENTS 2,188,675   1/1940   Cramer et al.

FOREIGN PATENTS 695,524   9/1930   France.
672,359   3/1939   Germany.

MARTIN P. SCHWADRON, *Primary Examiner.*

FRANK SUSKO, *Examiner.*